Feb. 7, 1967     H. M. STRONG ETAL     3,303,053
PATTERN DIAMOND GROWTH ON DIAMOND CRYSTALS
Filed March 26, 1963

Inventors:
Herbert M. Strong,
Roy E. Tuft,
by James J. Lichiello
Their Attorney.

3,303,053
PATTERN DIAMOND GROWTH ON
DIAMOND CRYSTALS
Herbert M. Strong, Schenectady, and Roy E. Tuft, Guilderland Center, N.Y., assignors to General Electric Company, a corporation of New York
Filed Mar. 26, 1963, Ser. No. 268,066
10 Claims. (Cl. 117—212)

This invention relates to diamond growth and more particularly to a growth process practiced on a specific portion or surface area of a diamond crystal, and which provides certain prescribed indicia on the surface of a diamond crystal in positive or negative relief.

In a diamond growth process where a carbonaceous material is converted to diamond, the diamond so grown is in the form of a somewhat perfect or at least well defined single crystal. This crystal is usually of cubic, octahedral, cubo-octahedral configuration, etc. with each face of the crystal also of an accurate geometric configuration with a smooth surface. In many applications, it is desirable to have certain identifying features or marks on these diamond surfaces. For example, these features or marks may be artistic in nature, may relate to property ownership, trademarks or other such symbols generally. Additionally, in industrial applications these marks may be utilized for assembly correlating purposes or utilized in connection with certain process. For example, these marks or traces may have useable electrical properties.

According, it is an object of this invention to provide a diamond having predetermined relieved indicia grown thereon.

It is another object of this invention to provide a process of growing relieved identification marks on a diamond.

It is another object of this invention to provide a process of growing relieved intelligible and artistic symbols on a diamond surface.

It is another object of this invention to provide electrically conductive marks on a diamond crystal.

Briefly described this invention in one form includes placing a catalyst metal pattern or stencil adjacent a smooth diamond surface, placing the diamond with the attached stencil in a high pressure high temperature apparatus, and subjecting the diamond to a combination of high pressures and high temperatures above the graphite-to-diamond equilibrium line on the phase diagram of carbon to cause more diamond to grow on particular areas and less on other areas of the diamond crystal surface, as influenced by the pattern, so that a suitable relieved indicia is provided on the diamond surface.

This invention will be better understood when taken in connection with the following specification and the drawing in which:

FIG. 2 is an illustration of the letter M grown on a diamond surface by the practice of this invention;

FIG. 3 is an illustration of a raised surface on a diamond produced by the practice of this invention;

A general method of growing diamonds is disclosed in U.S. Patents 2,947,610, Hall et al., and 2,947,609, Strong. The method is briefly described as including the subjection of a carbonaceous material, usually graphite, together with a metal catalyst solvent including one of the metals of Group VIII of the Periodic Table of Elements, chromium, tantalum, and maganese, to sufficiently high pressures and high temperatures above the graphite-to-diamond equilibrium line on the phase diagram of carbon where the particular catalyst metal is molten and operative to provide diamond growth from the carbonaceous material.

Figure 1:
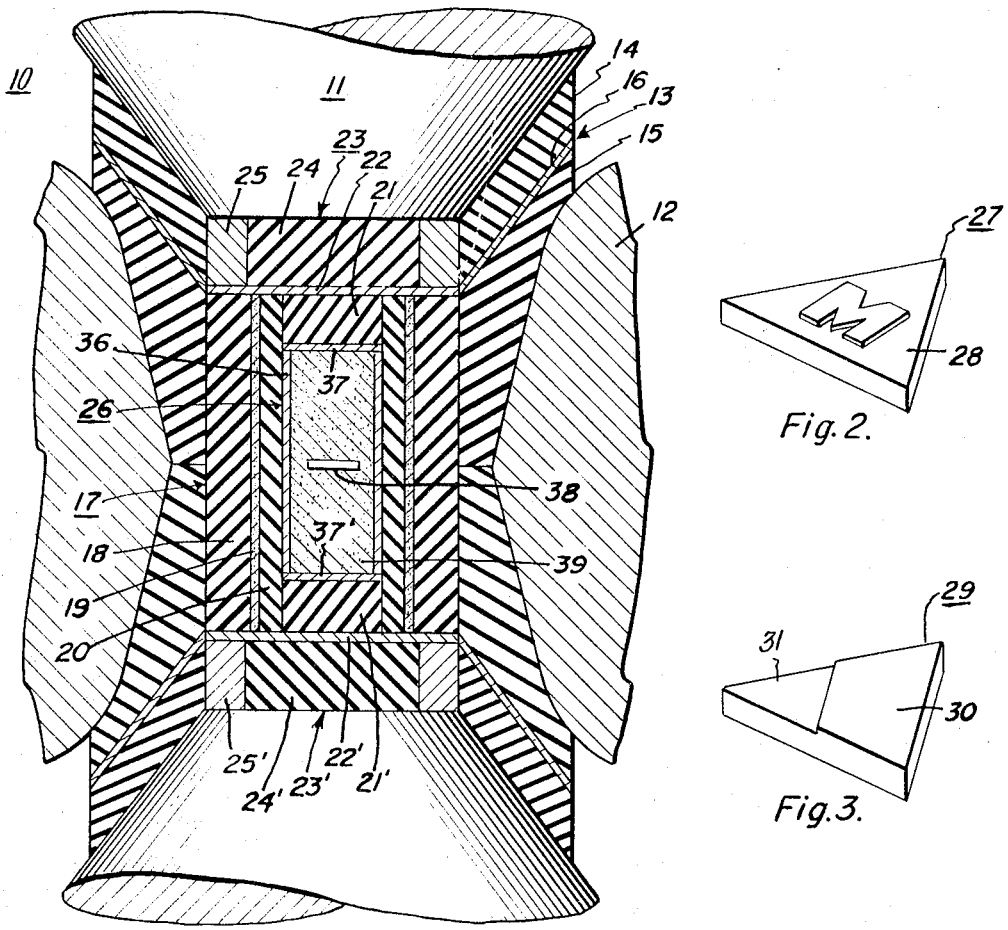
FIG. 1 is an illustration of one apparatus and arrangement in which the practices of this invention may be performed.

The practice of the above method and this invention generally requires an apparatus capable of withstanding the required high pressures and high temperatures. One suitable apparatus utilized to grow diamonds is disclosed in U.S. Patent 2,941,248, Hall, and is briefly described in FIG. 1. Referring now to FIG. 1, apparatus 10 includes a pair of punches 11 and 11' and an intermediate belt or die 12. Between each punch 11 and 11' and die 12 there is included a gasket assembly 13 comprising a pair of thermally insulated and electrically nonconducting stone gaskets 14 and 15 and an intermediate metallic gasket 16. Reaction vessel 17 which is inserted into die 12 is of the type disclosed in U.S. Patent 3,031,269 and in one preferred form includes a hollow pyrophyllite cylinder 18 of approximately .930 inch length. Positioned concentrically within and adjacent cylinder 18 is a graphite electrical resistance heater tube 19 of approximately .025 inch wall thickness. Within the graphite tube 19 there is also concentrically positioned a shorter alumina liner or cylinder 20. The ends of the cylinder 20 are then fitted with a pair of alumina plugs 21 and 21' to effectively close the ends of liner 20. Electrically conductive metal discs 22 and 22' are utilized at each end of the cylinder 18 to provide electrical connection to graphite heater tube 19. Adjacent each disc 22 and 22' is an end cap assembly 23 and 23' each comprising a pyrophyllite plug or disc 24 surrounded by an electrical conducting ring 25.

Motion of one or the other punches towards each other compresses a gasket assembly 13 and reaction vessel to raise pressure in the vessel. At the same time, electrical current is provided from a source (not shown) to flow through punches 11 and 11' into the graphite resistance heater tube 19 to indirectly heat and raise the temperature of a general specimen in tube assembly 26 in reaction vessel 17.

It has been discovered that, when placing a thin strip or sheet of a catalyst metal adjacent a diamond surface and then subjecting the diamond to high pressures and high temperatures above the graphite-to-diamond equilibrium line and in the range of pressures and temperatures where the catalyst metal is operative to cause diamond to grow, diamond growth occurs according to the configuration of the catalyst metal sheet. For example, if the sheet or strip covers the entire surface of the diamond then new diamond growth occurs very slowly between the sheet and the diamond. However, if there is an opening in the metal strip then the diamond grows on that portion of the diamond surface not covered, i.e., in the opening, much faster than diamond grows between the catalyst metal strip and the diamond surface. After recovery the diamond includes a protrusion of projected growth from the diamond surface. In other words, the opening in the metal sheet defines a growth area of a raised image. Accordingly, when a thin strip of catalyst metal representing a desired image is placed against the face or surface of a seed diamond, rapid growth occurs all around the image and slow growth occurs between the metal and diamond so that the image is in the form of a depression. The inverse method is to provide a cutout image from the metal sheet and place the remaining outline image against the diamond. Under these conditions growth proceeds slowly under the metal sheet and more quickly on the exposed areas. The described process using as overlays various pattern-defining means formed from catalyst metal may, therefore, provide diamonds having various indicia such as marks, traces and other relieved impressions both artistic and utilitarian. These indicia may also be grown in various colors through addition of such elements in the reactants as boron to provide shades of blue, and aluminum for whiteness.

In using boron or aluminum for example, the new growth becomes more electrically conducting than the original crystal and also semiconductive. If the boron for example is pressed or otherwise placed in the metal sheet in a desired pattern, then the boron will be incorporated into the new growth in the same pattern. Various semiconductive patterns, junctions, or electrical circuits and elements, therefore, may be grown by the practice of this invention to provide a diamond electrical element as part of a circuit.

Representative examples of the products of this invention are shown in FIGS. 2–5. In FIGS. 2–5 the diamond crystal illustrated referred to as a macle. As illustrated a macle is a thin plate-like diamond in triangular form, and technically known as a twin crystal. Macles were employed in the practice of this invention to facilitate the process because of the rather large surfaces available, and also for economy reasons.

Referring now to FIG. 2 the macle diamond 27 includes a flat surface 28 having the letter M suitably grown thereon. The height of the letter M above surface 28 depends on the length of growth time but may be as much as 0.005 to 0.040 inch. In this figure the edge length of the diamond macle was about 0.130 inch.

In FIG. 3 a macle diamond 29 includes a raised surface portion 30 and a lower surface portion 31. Either or both surfaces may also be made electrically conductive, for example, by providing new growth for surface 30 which is not electrically conductive, where the macle seed crystal is electrically conductive or has been made so. Alternatively, surface 30 may be an electrically conductive growth layer.

Figure 4:
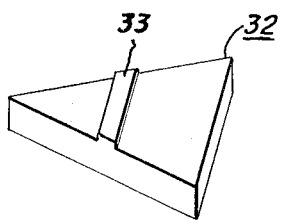
FIG. 4 is an illustration of a bar projection grown on a diamond by the practice of this invention.

In FIG. 4 diamond 32 includes an exemplary raised mark 33 although the mark may be in negative relief. Numerous choices are available for different surfaces to be or not to be more electrically conductive than the normal or insulating character of diamond.

Figure 5:
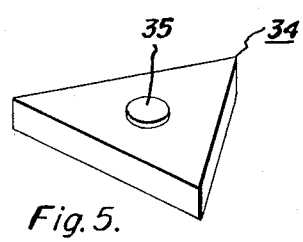
FIG. 5 is an illustration of a cylindrical projection grown on a diamond by the practices of this invention.

FIG. 5 is also exemplary of a diamond 34 having a raised spot or portion 35. A choice of surface is available to be colored or made electrically conductive to provide p-junctions, n-junctions, etc.

The following examples are representative practices of this invention. The tube assembly 26 of FIG. 1 was employed to contain a macle diamond packed in graphite. Referring again to FIG. 1, tube assembly 26 includes a tube 36 of tantalum, titanium, tungsten, or other high temperature melting point metal and a pair of end discs 37 and 37' of the same metal as tube 36. The operative temperature conditions of the practice of this invention are maintained less than the melting temperature of tube 36. The diamond seed 38 is illustrated as packed in graphite 39.

*Example 1*

The letter "M" was cut from a small strip of .002 nickel sheet to provide a stencil. This stencil was placed in parallel adjacent relationship to the large flat surface of a macle diamond. The diamond with the attached letter M stencil was placed in the reaction vessel of FIG. 1 and subjected to a pressure in the range of 54 to 60 kilobars and a temperature of about 1430° C. After being subjected to these pressures and temperatures for a period of time of about 5 minutes, temperature and pressure were reduced and diamond was recovered from the reaction vessel. The letter M was clearly formed on the diamond surfaces in positive relief as illustrated in FIG. 2.

*Example 2*

The letter K was formed of nickel wire of 0.005 diameter and placed adjacent a macle diamond surface. The practice of Example 1 was followed and a diamond was recovered with a letter K therein in negative relief.

*Example 3*

The practice of Example 2 was followed for the letters C and B.

*Example 4*

A diamond surface with a few grains of boron thereon was covered with a thin (.002 inch nickel foil layer). This diamond was subjected to a pressure and temperature of 54–60 kilobars and 1430° C. for about 5 minutes. After recovery from the reaction vessel it was found that new growth had occurred under the metal foil and upon measuring, the growth was found to be electrically conductive of about 100 ohms resistivity and with semiconductive characteristics.

In the practice of this invention, the use of preferably thin metal sheets or strips of .001–.005 inch thick of the desired indicia, or having the desired indicia removed therefrom will provide controlled growth which is less between the metal sheet and the diamond than it is where the surfaces of the diamond are not covered by the metal sheet. Accordingly, various identifying means, indicia, electrically conductive and semiconductive portions and traces may be grown on a given diamond surface. Where more than one doping agent, of those materials which will provide different electrical characteristics, are desired, intermixing thereof may be prevented by incorporating one such agent separately in very thin foil of an alloying metal which melts and deposits its agent in place before the other metal adjacent thereto melts. Finally, the rest of the foil is melted to complete the growth. While macle diamonds were employed in the present invention because of their relative ease in handling in the reaction vessel and because of the large exposed surfaces, various other diamond configurations may be utilized where a surface is provided which is large enough to provide the placing of the sheet or indicia of metal thereon in the reaction vessel as disclosed. A further particular advantage in using macles is that upon a single diamond face crystal, two triode transistor elements may be deposited which would be well insulated from each other.

The objects of this invention are thus achieved by controlling diamond growth on a diamond crystal through a suitable covering material so that new growth is effected by the material, agents in the material, or by cutouts in the material. The material so employed is preferably a metal which includes a catalyst solvent metal for diamond growth. However, various masking and inert materials such as alumina, thoria, magnesia, etc., may be employed to define an indicia and then the diamond surface is covered by a catalyst metal to provide growth on uncovered areas.

While a preferred practice of this invention has been described, it is not intended that the invention be limited to the particular description nor to the particular modification included therein, and it is intended by the appended claims to cover all modifications within the spirit and scope of this invention.

What we claim as new and desired to secure by Letters Patent of the United States is:

1. The method of growing a predetermined pattern of diamond growth on a diamond surface which comprises:
    (a) overlaying less than the full area of a surface of a diamond with a pattern-defining means,
        (1) said pattern-defining means being made of metal catalytic to the diamond forming reaction,
    (b) subjecting said diamond and said pattern-defining means together with carbonaceous material covering said diamond surface and said pattern-defining means to a combination of pressures and temperatures above the graphite-to-diamond equilibrium line on the phase diagram of carbon whereby more diamond growth occurs on the uncovered portion of said diamond, and (c) reducing the temperature and pressure and recovering said diamond with a predetermined pattern of growth thereon substantially corresponding to said uncovered portion.

2. The method as recited in claim 1 wherein the pattern-defining means is a thin metal sheet having a cutout portion and the predetermined pattern produced is in positive relief.

3. The method as recited in claim 1 wherein the pattern-defining means is a thin metal strip in the desired configuration and the predetermined pattern produced is in negative relief.

4. The method as recited in claim 1 wherein the metal of the pattern-defining means includes a material whose atoms are receptive in a diamond crystal during the process of growth thereof and operative therein to increase the electrical conductive characteristics of the diamond growth.

5. The method as recited in claim 4 wherein the included material is boron.

6. The method as recited in claim 4 wherein the included material is aluminum.

7. As an article of manufacture, a diamond crystal having on at least one surface thereof at least one electrically isolated region of semi-conducting diamond in a preselected configuration.

8. The diamond crystal substantially as recited in claim 7 wherein the semi-conducting diamond region contains boron atoms.

9. The diamond crystal substantially as recited in claim 7 wherein the semi-conducting diamond region contains aluminum atoms.

10. The method of growing a predetermined pattern of diamond growth substantially as recited in claim 1, wherein the pattern-defining means has a thickness ranging from about 0.001 to about 0.005 inch.

References Cited by the Examiner

UNITED STATES PATENTS

| | | | |
|---|---|---|---|
| 3,142,595 | 7/1964 | Wentrof | 23—209.1 X |
| 3,148,161 | 9/1964 | Wentorf et al. | 252—502 |

OSCAR R. VERTIZ, Primary Examiner.

E. J. MEROS, Assistant Examiner.